UNITED STATES PATENT OFFICE.

JULES BAQUOL, OF BALTIMORE, MARYLAND.

IMPROVEMENT IN COMPOUNDS FOR EXPELLING FLIES FROM ROOMS.

Specification forming part of Letters Patent No. 136,203, dated February 25, 1873.

*To all whom it may concern:*

Be it known that I, JULES BAQUOL, of Baltimore, in the county of Baltimore and State of Maryland, have invented a certain Improvement in a Compound for Clearing Rooms of Flies, of which the following is a specification:

This invention, as its name indicates, has for its object to rid apartments of any description of flies. The compound can be used in two different forms, either as a liquid or as a paste. In either case the principal ingredient is the same—viz., powdered laurel leaves.

To prepare the liquid, boil two and a half pounds of powdered laurel leaves in two gallons of water till the strength is exhausted. Add to this decoction as much quicklime as can be slaked in it, and apply the wash to the walls of the room. When dry add a coat of whitewash to conceal the blackness of the first coat. A room thus prepared will be clear of flies for six months.

To prepare the paste, to one pint powdered laurel leaves add a quarter pint of glycerine and stir them together. Apply the paste upon window and door casings, and the room will soon be empty of flies. Two applications will keep even a kitchen clear of the insects for a fortnight.

There is nothing disagreeable to human beings in the odor of the wash or the paste, nor anything deleterious to health in either of them.

I claim as my invention—

1. The compound of powdered laurel leaves and glycerine, herein described.
2. The compound of decoction of laurel leaves and lime, herein set forth.

JULES BAQUOL.

Witnesses:
   JACOB EPPLER,
   CHARLES BAQUOL.